United States Patent [19]
Crispie et al.

[11] Patent Number: 5,902,925
[45] Date of Patent: May 11, 1999

[54] SYSTEM AND METHOD FOR HIGH ACCURACY CALIBRATION OF A SENSOR FOR OFFSET AND SENSITIVITY VARIATION WITH TEMPERATURE

[75] Inventors: Finbarr J. Crispie, Mountain View; Mohammad Yunus, Fremont, both of Calif.

[73] Assignee: Integrated Sensor Solutions, San Jose, Calif.

[21] Appl. No.: 08/674,028

[22] Filed: Jul. 1, 1996

[51] Int. Cl.$^6$ .................................................. G01L 27/00
[52] U.S. Cl. .............................. 73/1.88; 73/1.61; 73/1.62; 73/1.59; 324/601
[58] Field of Search ............................. 73/1 R, 4, 3, 1 G, 73/766, 1.01, 1.61, 1.62, 1.07, 1.34, 1.88, 1.59; 324/202, 601; 364/571.01, 571.07

[56] References Cited

U.S. PATENT DOCUMENTS

| | | | |
|---|---|---|---|
| 4,355,537 | 10/1982 | vander Have | 73/766 |
| 4,437,164 | 3/1984 | Branch, III | 73/766 |
| 4,933,535 | 6/1990 | Zabinski | 219/497 |
| 5,027,015 | 6/1991 | Czarnocki | 307/491 |

*Primary Examiner*—Hezron E. Williams
*Assistant Examiner*—Nashmiya Fayyaz
*Attorney, Agent, or Firm*—Sawyer & Associates

[57] ABSTRACT

A digital compensation circuit for calibrating a sensor is described. The compensator circuit includes a serial communication circuit for receiving data relating to a plurality of parameters and a compensation circuit coupled to serial communication circuit for providing piece-wise linear compensation of a temperature coefficient (TC). In one embodiment, the compensation circuit further includes a detector for detecting a threshold for a digital temperature and providing an output and a plurality of registers coupled to the detector and the serial communication circuit, a first plurality of registers for providing a first value if the digital temperature is above the threshold, a second of the plurality of registers for providing a second value if the digital temperature is below the threshold. The compensation circuit further includes a selector coupled to the detector and the plurality of registers for selecting one of the first and second of the plurality of registers dependent upon the output of the detector for providing piece-wise linear compensation of a temperature coefficient.

8 Claims, 5 Drawing Sheets

SYSTEM AND METHOD FOR HIGH ACCURACY CALIBRATION OF A SENSOR FOR OFFSET AND SENSITIVITY VARIATION WITH TEMPERATURE

FIELD OF THE INVENTION

The present invention relates generally to sensors and more particularly to improving the calibration of such sensors.

BACKGROUND OF THE INVENTION

Piezoresistive and capacitive sensors are being used in increasingly higher accuracy applications for sensing various changes in pressure and the like in a variety of environments. Because the output of these sensors typically varies over temperature, the sensors require compensation and calibration in order to achieve the accuracy and temperature stability requirements of these applications. The calibration of sensors typically requires the adjustment of four parameters to achieve optimum output performance over temperature—offset, offset temperature coefficient (OTC), signal gain, and gain temperature coefficient (GTC).

In general the transfer function of a sensor is given by:

$$V\text{sens} = \text{Offset}_0 \cdot (1+\alpha_1 \cdot T+\alpha_2 \cdot T^2+ \ldots +\alpha_n \cdot T^n) + S_0 \cdot (1+\beta_1 \cdot T+\beta_2 \cdot T^2+ \ldots +\beta_n \cdot T^n) \cdot Q \quad \text{Equation 1}$$

where:

Vsens is the sensor output voltage $\text{Offset}_0$ is the sensor offset (output with zero excitation) at a reference temperature (e.g. 25° C.)

$\alpha_1$ is the first order temperature coefficient of the sensor offset $\alpha_2$ is the second order temperature coefficient of the sensor offset $\alpha_n$ is the $n^{th}$ order temperature coefficient of the sensor offset T is the temperature difference from the reference temperature $S_0$ is the sensor sensitivity or span at the reference temperature (e.g. 25° C.)

$\beta_1$ is the first order temperature coefficient of the sensor sensitivity $\beta_2$ is the second order temperature coefficient of the sensor sensitivity $\beta_n$ is the $n^{th}$ order temperature coefficient of the sensor sensitivity Q is the physical parameter being sensed (e.g. pressure, acceleration, etc.)

For most sensor applications, all but the first order terms can be ignored so that Equation 1 becomes:

$$V\text{sens} = \text{Offset}_0 \cdot (1+\alpha \cdot T) + S_0 \cdot (1+\beta \cdot T) \cdot Q \quad \text{Equation 2}$$

However, for high accuracy sensor applications, the second order terms are usually included so that Equation 1 becomes:

$$V\text{sens} = \text{Offset}_0 \cdot (1+\alpha_1 \cdot T+\alpha_2 \cdot T^2) + S_0 \cdot (1+\beta_1 \cdot T+\beta_2 \cdot T^2) \cdot Q \quad \text{Equation 3}$$

To compensate this signal, a signal conditioning circuit is required which must subtract out the offset terms and provide amplification which varies with temperature to counteract the effect of the sensor span (TC). Traditionally, the signal conditioning has been done with opamps and laser trimmed resistors. However, this type of signal conditioning circuit is usually limited to providing first order correction of the temperature dependent terms. In addition this method is expensive as it requires the use of a laser and the solution is typically not monolithic (on a single integrated circuit) as the opamps and resistors are usually built on separate substrates.

An embodiment of a conventional digital compensation circuit 100 is shown in FIG. 1. In this embodiment, the differential signal from the sensor 5' is fed into an amplifier 102 which may have a gain of 1 or greater depending on the application. The output of this amplifier is fed into another amplifier stage 104 whose gain is controlled by the contents of a gain register 106. In addition, the offset and offset TC terms are added at summation point 114 in this stage using DACs 108, 110, 112 controlled by digital parameters. The compensation of the sensor sensitivity TC is done in the third stage 116 after the offset, offset TC and gain compensation. The third stage 116 may also have a gain of 1 or greater depending on the application. The final stage is an output buffer 111.

In this circuit, the temperature, T, is sensed using an on-chip proportional to absolute temperature (PTAT) circuit 122. The analog signal representing T is digitized using an analog-to-digital converter 124. The digital word representing T is then used to control two DACs 110 and 120, one for the offset TC compensation and the other for the gain TC compensation Digital information representing the values of the compensation terms, is serially fed into an on-chip control unit 125. The individual bits are decoded and sent to the various DACs 108, 110, 112, and 118. Once the correct binary code has been selected to center the sensor characteristic in the specified range, the code is stored using a digital storage method such as zener-zap, EEPROM or fuse link. The transfer function of this circuit 100 is given by Equation 4.

$$V\text{out} = (V\text{sens} + V\text{off} + V\text{otc} \cdot T) \cdot \text{Gain}_0 \cdot (1+\delta \cdot T) \quad \text{Equation 4}$$

Combining equations 3 and 4 gives:

$$V\text{out} = [S_0 \cdot Q \cdot (1+\beta_1 \cdot T+\beta_2 \cdot T^C) + \text{Offset}_0 \cdot (1+\alpha_1 \cdot T+\alpha_2 \cdot T^2) + V\text{off} + V\text{otc} \cdot T] \cdot \text{Gain}_0 \cdot (1+\delta \cdot T) \quad \text{Equation 5}$$

Vout is the calibrated sensor output voltage (output of conditioning circuit)

$\text{Gain}_0$ is the gain of the compensating amplifier at the reference temperature Voff is the offset added by the conditioning circuit Votc·T is the temperature dependent component of the offset added by the conditioning circuit $\delta$ is the temperature dependent component of the gain of the compensating amplifier which counteracts the temperature dependent component of the sensor sensitivity The calibration of the sensor involves making measurements of Vout at various values of Q and various temperatures and thereby deducing the values of Voff, Votc, $\text{Gain}_0$ and $\delta$ to minimize the error between Vout and the ideal sensor characteristic. Ideally the Voff, and $\text{Gain}_0$ terms would be found first using measurements at the initial calibration temperature at minimum and maximum Q. The temperature dependent terms would then be found by an additional set of measurements at high (or low) temperature.

By setting:

Voff=−Offset$_0$

Votc=−Offset$_0$·α$_1$ and δ=−β$_1$ equation 5 becomes:

$$V_{out}=S_0 \cdot Q \cdot Gain_0 \cdot [1+T^2 \cdot (\beta_2+\delta \cdot \beta_1)_2+T^3 \cdot \delta \cdot \beta_2]+Offset_0 \cdot \alpha_2 \cdot Gain_0 \cdot (1+\delta \cdot T) \cdot T^2$$

Equation 6

The desired term is simply $S_0 \cdot Q \cdot Gain_0$. All the other terms arise because this circuit only corrects for linear variations of the sensor offset and sensitivity with temperature. In high accuracy applications these extra terms may limit the usability of the sensor since it may be impossible to calibrate the sensor within the desired specification.

Accordingly, what is needed is a system and method to allow for more accurate calibration of sensors. The system and method should be easy to implement and cost effective. The present invention addresses such a need.

SUMMARY OF THE INVENTION

A digital compensation circuit for calibrating a sensor is described. The compensator circuit comprises a serial communication circuit for receiving data relating to a plurality of parameters, and means coupled to serial communication circuit for providing piece-wise linear compensation of a temperature coefficient (TC).

The piece-wise linear compensation means further comprises detector means for detecting a threshold for a digital temperature and providing an output, and a plurality of registers coupled to the detector means and the serial communication circuit, a first of the plurality of registers for providing a first value if the digital temperature is above the threshold, a second of the plurality of registers for providing a second value if the digital temperature is below the threshold. The piece-wise linear compensation means further includes a selector means coupled to the detector means and the plurality of registers, for selecting one of the first and second of the plurality of registers dependent upon the output of the detector means for providing piece-wise linear compensation of a temperature coefficient.

DETAILED DESCRIPTION

The present invention relates to an improvement of a calibration system for a sensor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is an improvement over conventional calibration schemes. In the present invention the second order behavior of sensor offset and sensitivity with temperature are approximated by a piece-wise-linear function. In the present invention, the offset and sensitivity behavior is approximated by two different linear functions, one for low temperature and one for high temperature. The switch-over point from one function to another is known as the pivot temperature and is the value at which the temperature T is zero (reference temperature). In so doing a highly accurate sensor calibration is provided. To more particularly describe the features of the present invention refer now to the following discussion in conjunction with the Figures.

Figure 1:
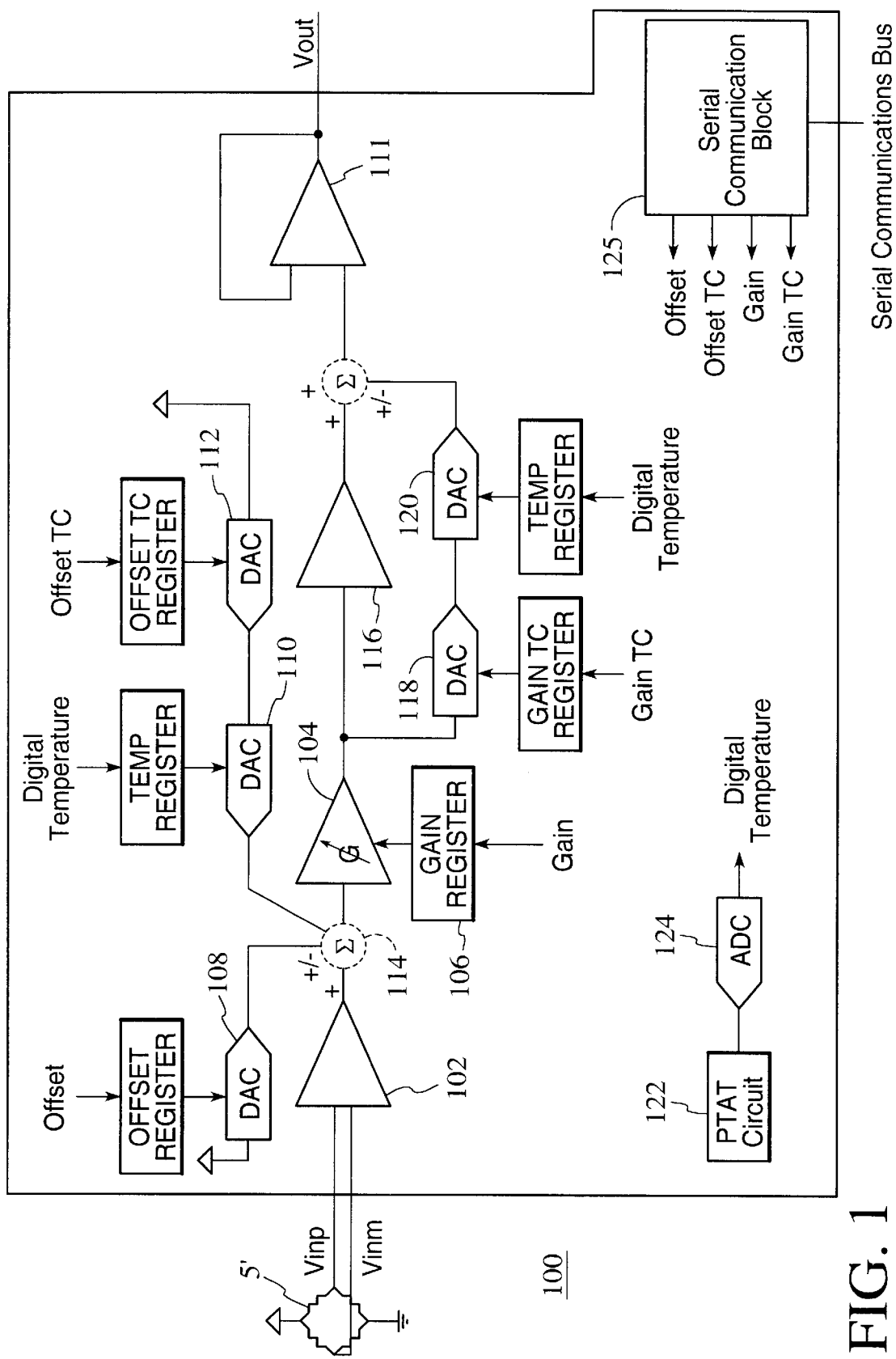
FIG. 1 is a diagram of a sensor conventional calibration circuit.
Figure 2:
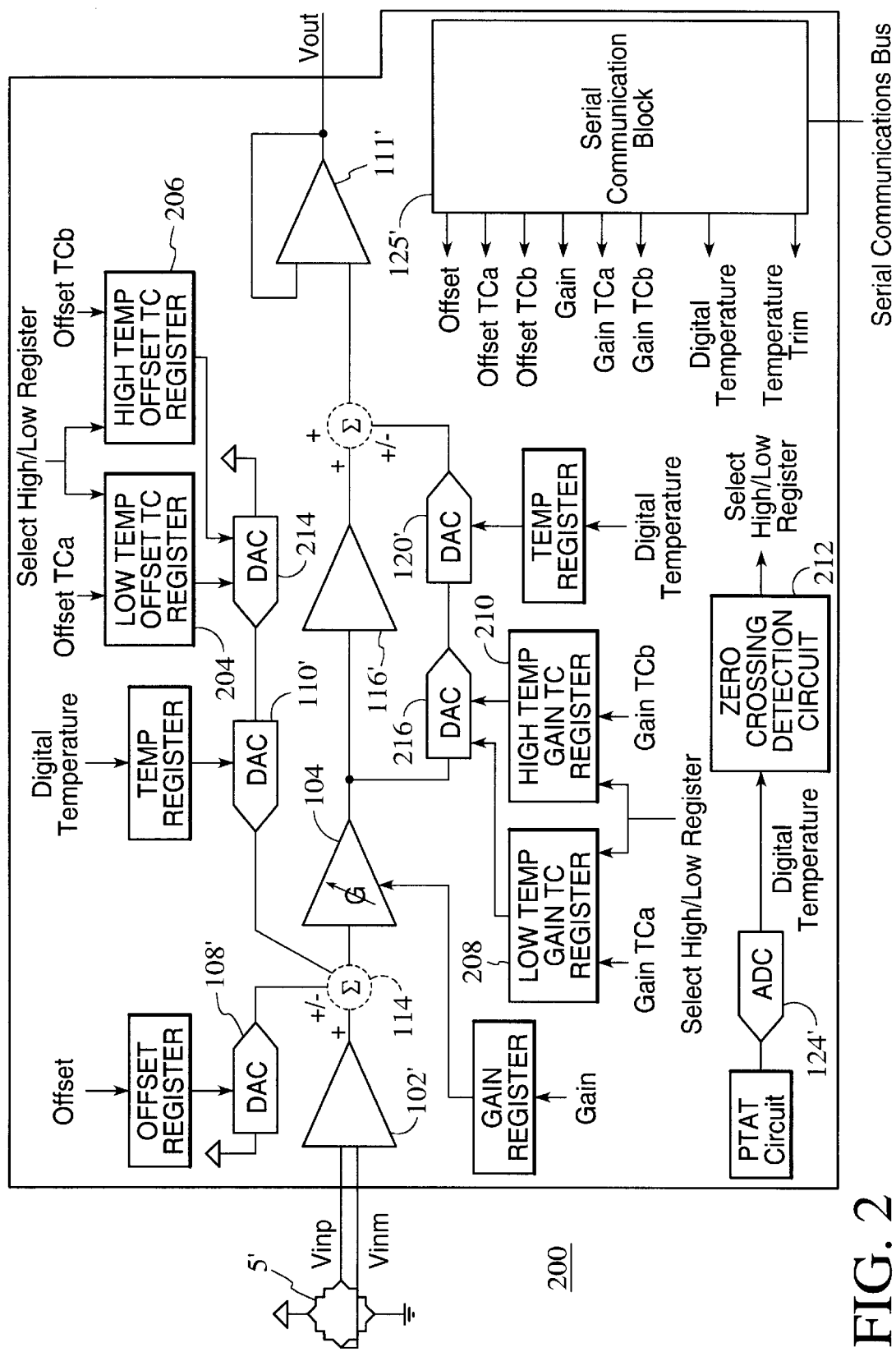
FIG. 2 is a block diagram of a high accuracy calibration system 200 in accordance with the present invention.

FIG. 2 is a block diagram of a high accuracy calibration system 200 in accordance with the present invention. As is seen system 200 has many of the common components as those shown in system 100 of FIG. 1. Those components are given similar designations as described in FIG. 1.

The piece-wise-linear approximation for offset TC correction is implemented by providing two offset TC registers 204 and 206. The value in one register 204 is fed to the offset TC DAC 214 for low temperature and the value in the other register is fed to the offset TC DAC 214 for high temperature. The circuit 212 detects when the temperature crosses the zero point and switches the inputs to the offset TC DAC 214 from one register to the other.

The piece-wise linear approximation for gain TC correction is implemented by two gain TC registers 208 and 210. The value in one register 208 is fed to the gain TC DAC 216 for low temperature and the value in the other register 210 is fed to the gain TC DAC 216 for high temperature. The circuit 212 detects when the temperature crosses the zero point and switches the inputs to the DAC from one register to the other.

In a preferred embodiment, the temperature T is represented as a ten (10) bit digital word with 512 being the value at the pivot temperature. In this way the detector circuit for the pivot temperature is, for example, a simple logic inverter connected to the most-significant-bit (MSB) of the temperature word. When this bit is logic 1, the digital temperature word is greater than or equal to 512 and therefore, the temperature T is greater than or equal to zero. If the MSB is logic 0, the digital temperature word is less than 512 and therefore T is less than zero.

In addition, in the preferred embodiment is included means for providing piece-wise-linear compensation for both sensor offset TC and gain TC although one of ordinary skill in the art will recognize that a particular sensor may require piece-wise linear compensation of offset TC but not of sensitivity TC or vice versa and it would be within the spirit and scope of the present invention to provide piece-wise-linear compensation of that one parameter only.

Figure 3:
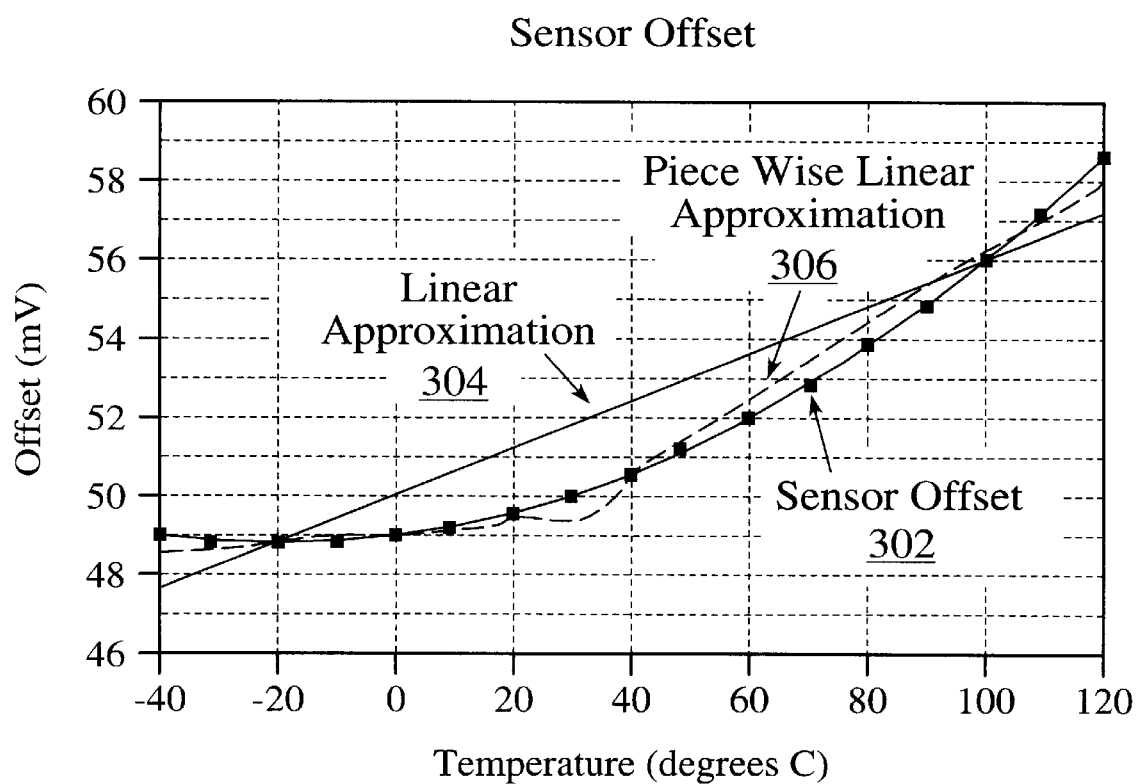
FIG. 3 shows typical sensor offset behavior together with a linear approximation and a piece-wise-linear approximation using the present invention.

FIG. 3 shows typical sensor offset behavior 302 together with a linear approximation 304 such as that provided by the circuit 100 in FIG. 1 and a piece-wise-linear approximation 306 such as that provided by the circuit 200 of FIG. 2 of the present invention. As is seen the piece-wise linear approximation more closely follows the offset behavior. Similarly, a piece-wise-linear approximation can be used for correcting the sensitivity temperature behavior.

Figure 4:
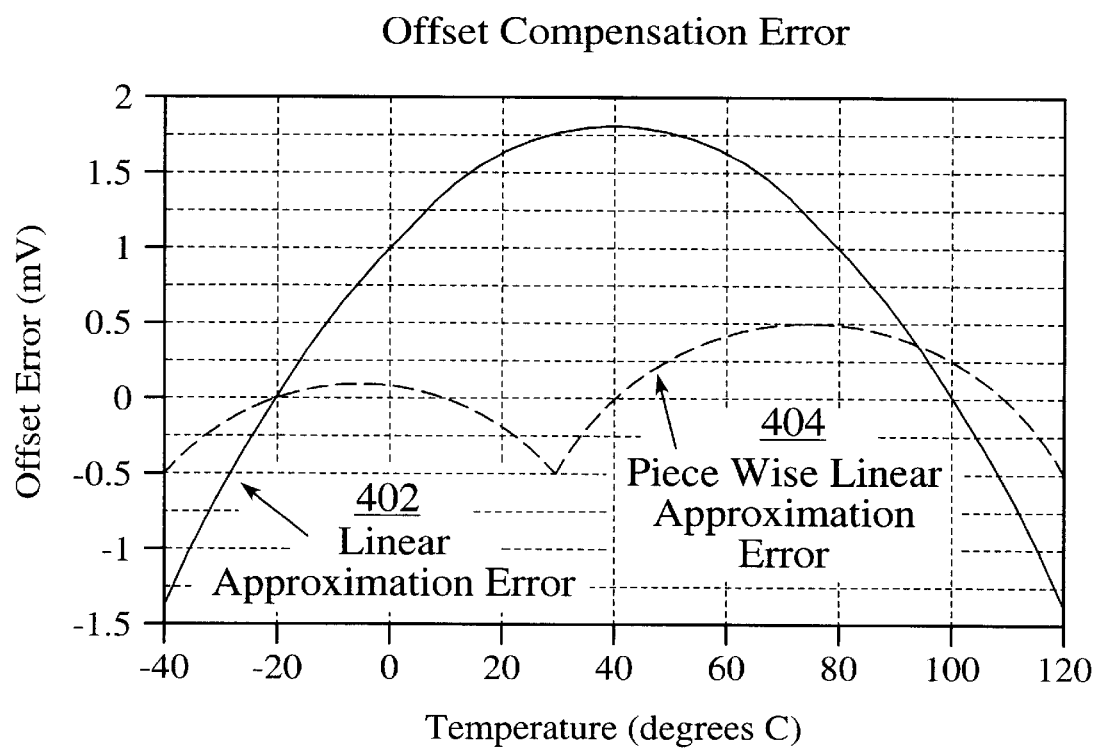
FIG. 4 illustrates the residual errors in the offset term for both the linear approximation and the piece-wise-linear approximation method.

To further illustrate this point, FIG. 4 is a waveform that shows the residual errors in the offset term for both the linear approximation 402 and the piece-wise linear approximation 404. As is seen, the piece-wise-linear approximation error is clearly smaller thus allowing for higher accuracy compensation.

Figure 5:
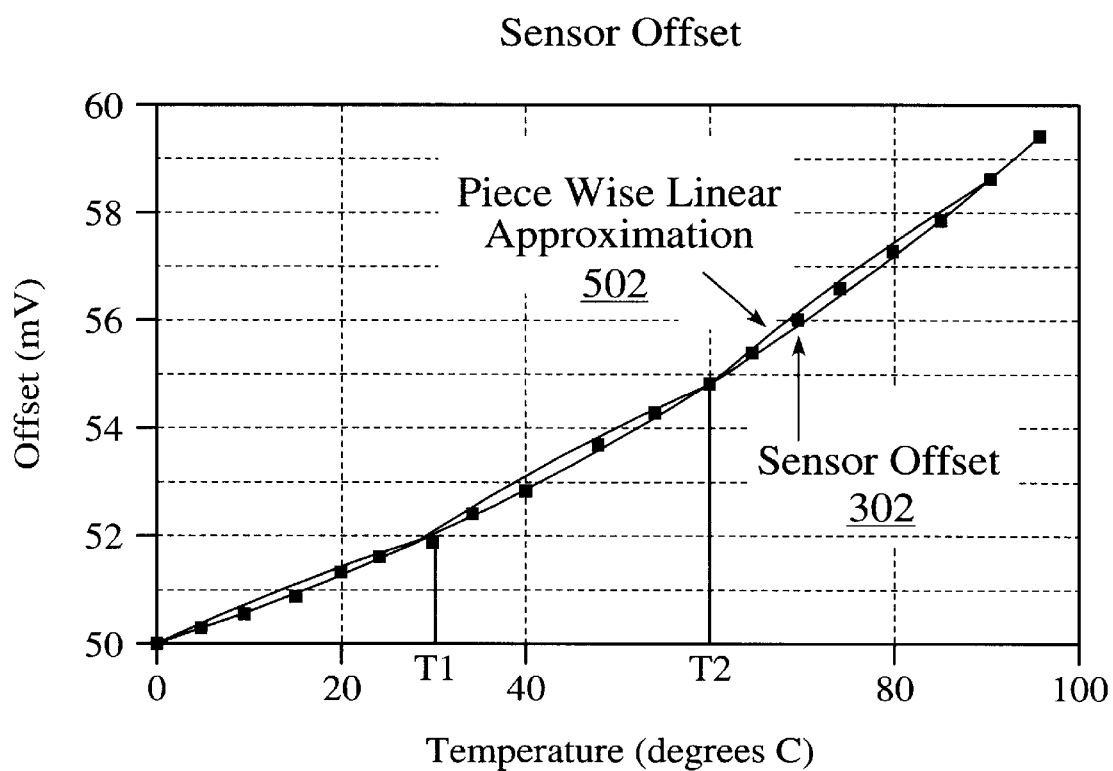
FIG. 5 illustrates a multi-part piece-wise-linear function.

An extension of this method is the use of multiple registers to approximate the offset or sensitivity TC behavior of the sensor with more than two linear functions. In this way the operating temperature region of the sensor can be broken up into multiple segments and different linear functions used to approximate the offset or sensitivity behavior in each region. In this case the detection circuit must detect multiple thresholds and in addition it must perform some arithmetic functions to avoid discontinuities at the segment switch-over points. For example, suppose the offset characteristic in FIG. 3 were to be approximated by a three part piece-wise-linear function between T=0, and T=$T_3$, such as that shown in FIG. 5 (502). The switch-over points are T=$T_1$ and T=$T_2$. The equations of the approximating function are given by equations 7a–7c:

Segment 1, $0<T<T_1$ $$\text{CompensatingOffset} = V\text{off} + V\text{otc}_a \cdot T \qquad \text{Equation 7a}$$

Segment 2, $T_1<T<T_2$ $$\text{CompensatingOffset} = V\text{off} + V\text{otc}_a \cdot T_1 + V\text{otc}_b \cdot (T-T_1) \qquad \text{Equation 7b}$$

Segment 3, $T_2<T<T_3$ $$\text{CompensatingOffset} = V\text{off} + V\text{otc}_a \cdot T_1 + V\text{otc}_b \cdot (T_2-T_1) + V\text{ofc}_c \cdot (T-T_2) \qquad \text{Equation 7c}$$

Note that in each segment the constant portion of the compensating function is different. The additional terms, $V\text{otc}_a \cdot T$ in segment 2 and $V\text{otc}_a \cdot T_1 + V\text{otc}_b \cdot (T_2-T_2)$ in segment 3 can be inserted into the signal path via another offset DAC or they can be combined with Voff and inserted using the existing offset DAC. Since these terms are known at time of calibration they can be stored in memory and simply added in at the appropriate temperature. The detection circuit would therefore include an adder circuit to calculate the extra terms in addition to calculating the terms $T-T_1$ and $T-T_2$.

Although the preferred embodiment ony includes means for providing piece-wise-linearcompensation for sensor offset TC and sensitivity TC it should be clear that the present invention can also be used to correct for the temperature coefficient of the sensor linearity error. The sensor linearity error is the deviation of the sensor transfer characteristic (that is, sensor output versus Q where Q is the parameter being sensed) from an ideal straight line. In addition, one of ordinary skill in the art will recognize that a particular sensor may require piece-wise linear compensation of offset TC or of sensitivity TC or of linearity TC and it would be within the spirit and scope of the present invention to provide piece-wise-linear compensation only of those parameters requiring it.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A digital compensation circuit for calibrating a sensor comprising:

a serial communication circuit for receiving data relating to a plurality of parameters which relate to the sensor and for receiving a digital representation of a temperature, the serial communication circuit also providing a digital output including the digital representation of the temperature; and means coupled to the serial communication circuit for providing piece-wise linear compensation of a temperature coefficient for the sensor, the piece-wise linear compensation means further comprising:

detector means for detecting a threshold for the digital representation of the temperature and providing an output;

a plurality of registers coupled to the detector means and the serial communication circuit, a first register of the plurality of registers for providing a first value if the digital representation of the temperature is above the threshold, a second register of the plurality of registers for providing a second value if the digital representation of the temperature is below the threshold; and selector means coupled to the detector means and the plurality of registers for selecting one of the first register and the second register of the plurality of registers dependent upon the output of the detector means for providing piece-wise linear compensation of the temperature coefficient.

2. A digital compensation circuit for calibrating a sensor comprising:

a serial communication circuit for receiving data relating to a plurality of parameters which relate to the sensor; and means coupled to the serial communication circuit for providing piece-wise linear compensation of a temperature coefficient (TC) of the sensor based upon received data relating to the plurality of parameters, the piece-wise linear compensation means further comprising:

detector means for detecting a threshold for a digital representation of a temperature and providing an output;

a plurality of registers coupled to the detector means and the serial communication circuit, a first register of the plurality of registers for providing a first value, a second of the plurality of registers for providing a second value; and a selector means coupled to the detector means and the plurality of registers for selecting one of the first register and the second register of the plurality of registers dependent upon the output of the detector means for providing piece-wise linear compensation of the temperature coefficient.

3. The circuit of claim 2 in which the TC is a temperature coefficient of the sensitivity of the sensor.

4. The circuit of claim 2 in which the TC is a temperature coefficient of the sensor offset.

5. The circuit of claim 2 wherein the selector means selects the first register to provide the first value if the digital representation of the temperature is above the threshold;

the selector means selects the second register to provide the second value if the digital representation of the temperature is below the threshold; and the temperature coefficient is the sensor offset TC.

6. The circuit of claim 2 wherein the selector means selects the first register to provide the first value if the digital temperature is above the threshold;

the selector means selects the second register to provide the second value if the digital representation of the temperature is below the threshold; and the temperature coefficient is the sensor sensitivity TC.

7. The circuit of claim 5 wherein the piece-wise linear compensation means further provide piece-wise linear correction of a second temperature coefficient (TC) of the sensor, the second temperature coefficient being a sensor sensitivity TC;

in which the plurality of registers includes:

a third register for providing a third value if the digital representation of the temperature is above the threshold;

a fourth register for providing a fourth value if the digital representation of the temperature is below the threshold; and wherein the selector means selects the third register when the temperature is above the threshold, and the selector means selects the fourth register when the temperature is below the threshold, thereby providing piece-wise linear compensation of the sensor sensitivity TC.

8. The circuit of claim 2 in which the detector means comprises an inverter.

* * * * *